United States Patent
Hanson (10) Patent No.: US 11,015,636 B2
(45) Date of Patent: May 25, 2021

(54) NUT STRIP ASSEMBLY WITH ARRAY OF CAPTURED NUTS

(71) Applicant: United Technologies Corporation, Farmington, CT (US)

(72) Inventor: Russell B. Hanson, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 293 days.

(21) Appl. No.: 16/026,795

(22) Filed: Jul. 3, 2018

(65) Prior Publication Data

US 2020/0011366 A1 Jan. 9, 2020

(51) Int. Cl.
| F16B 27/00 | (2006.01) |
| F16B 37/04 | (2006.01) |
| F01D 25/24 | (2006.01) |
| F16B 5/00 | (2006.01) |

(52) U.S. Cl.
CPC .......... *F16B 37/044* (2013.01); *F01D 25/243* (2013.01); *F16B 5/0024* (2013.01); *F05D 2220/32* (2013.01); *F05D 2240/14* (2013.01); *F05D 2260/31* (2013.01)

(58) Field of Classification Search
CPC .................................................... F05D 25/243
USPC .............. 411/84, 88, 89, 92, 95, 97, 98, 101
See application file for complete search history.

(56) References Cited

U.S. PATENT DOCUMENTS

| 2,144,350 | A | * | 1/1939 | Swanstrom | ........... F16B 37/064 |
| | | | | | 411/84 |
| 2,333,386 | A | | 11/1943 | Murphy | |
| 2,409,209 | A | | 10/1946 | Johnson | |
| 2,421,201 | A | * | 5/1947 | Hallock | ................ F16B 37/044 |
| | | | | | 411/84 |
| 2,455,145 | A | * | 11/1948 | Swanstrom | ........... F16B 37/044 |
| | | | | | 411/85 |
| 2,469,311 | A | * | 5/1949 | Poupitch | ............... F16B 37/044 |
| | | | | | 411/84 |
| 2,542,375 | A | * | 2/1951 | Torresen | ............... F16B 37/044 |
| | | | | | 411/84 |
| 2,879,820 | A | * | 3/1959 | Trzcinski | .............. F16B 37/045 |
| | | | | | 411/84 |
| 2,968,329 | A | * | 1/1961 | Reiner | .................. F16B 37/044 |
| | | | | | 411/84 |
| 3,704,507 | A | | 12/1972 | Grube | |

(Continued)

FOREIGN PATENT DOCUMENTS

| FR | 2927383 B1 | 12/2014 |
| WO | 2016057010 A1 | 4/2016 |

OTHER PUBLICATIONS

EP search report for EP19172313.9 dated Nov. 5, 2019.

*Primary Examiner* — Gary W Estremsky
(74) *Attorney, Agent, or Firm* — Getz Balich LLC (57) ABSTRACT

A nut strip assembly is provided that includes a carrier and a plurality of nuts. The carrier includes a base, a plurality of first tabs and a plurality of second tabs. The base is configured with a plurality of apertures. Each of the first tabs is connected to and project out from a first side of the base. Each of the second tabs is connected to and projects out from a second side of the base. The nuts are secured to the carrier. Each of the nuts are aligned with a respective one of the apertures. Each of the nuts is captured between the base and a respective one of the first tabs. Each of the nuts captured between the base and a respective one of the second tabs.

16 Claims, 9 Drawing Sheets

(56) References Cited

U.S. PATENT DOCUMENTS

| | | | | |
|---|---|---|---|---|
| 4,895,484 | A * | 1/1990 | Wilcox | F16B 37/044 |
| | | | | 411/103 |
| 5,415,509 | A * | 5/1995 | Martin | F16D 1/06 |
| | | | | 403/315 |
| 5,716,178 | A * | 2/1998 | Vu | B64C 1/12 |
| | | | | 411/85 |
| 6,302,628 | B1 * | 10/2001 | Berecz | F16B 37/044 |
| | | | | 411/104 |
| 7,704,151 | B2 | 4/2010 | Vrana et al. | |
| 9,121,432 | B2 | 9/2015 | Wong et al. | |
| 9,140,125 | B2 | 9/2015 | Ivakitch et al. | |
| 9,551,456 | B2 | 1/2017 | Peters et al. | |
| 9,784,215 | B2 * | 10/2017 | Lu | F02K 1/80 |
| 9,790,814 | B2 * | 10/2017 | Henry | F01D 25/265 |
| 2013/0202430 | A1 | 8/2013 | Gaudry | |
| 2013/0202440 | A1 * | 8/2013 | Ivakitch | F01D 5/025 |
| | | | | 416/204 R |
| 2014/0286770 | A1 * | 9/2014 | Henry | F02K 1/80 |
| | | | | 415/213.1 |
| 2015/0139794 | A1 * | 5/2015 | Fillaud | F01D 25/28 |
| | | | | 415/214.1 |
| 2015/0226121 | A1 | 8/2015 | Cohin | |
| 2015/0267555 | A1 * | 9/2015 | Plante | F02K 3/06 |
| | | | | 415/119 |
| 2016/0290167 | A1 * | 10/2016 | Porter | F16B 43/00 |
| 2016/0363004 | A1 | 12/2016 | Chow | |

* cited by examiner

NUT STRIP ASSEMBLY WITH ARRAY OF CAPTURED NUTS

This invention was made with Government support awarded by the United States Air Force. The Government has certain rights in this invention.

BACKGROUND OF THE DISCLOSURE

1. Technical Field

This disclosure relates generally to mechanical attachments and, more particularly, to fastening components together with fasteners and nuts.

2. Background Information

Various assemblies are known in the art for securing components together using bolts and nuts. Some such assemblies may incorporate a nut plate, particularly in situations where the nut cannot readily be held by a technician during mating with the bolt. Examples of such a nut plate are disclosed in U.S. Pat. Nos. 9,551,456 and 9,121,432, which are assigned to the assignee of the present disclosure. While these know assemblies have various benefits, there is still room in the art for improvement.

SUMMARY OF THE DISCLOSURE

According to an aspect of the present disclosure, a nut strip assembly is provided that includes a carrier and a plurality of nuts. The carrier includes a base, a plurality of first tabs and a plurality of second tabs. The base is configured with a plurality of apertures. Each of the first tabs is connected to and projects out from a first side of the base. Each of the second tabs is connected to and projects out from a second side of the base. The nuts are secured to the carrier. Each of the nuts is aligned with a respective one of the apertures. Each of the nuts is captured between the base and a respective one of the first tabs. Each of the nuts is captured between the base and a respective one of the second tabs.

According to another aspect of the present disclosure, an assembly is provided that includes a first component, a second component and a nut strip assembly. The first component is configured with a plurality of first apertures. The second component is configured with a plurality of second apertures. The nut strip assembly secures the first component and the second component together. The nut strip assembly includes a carrier, a plurality of nuts and a plurality of fasteners. The carrier includes a base, a plurality of first tabs and a plurality of second tabs. The base is configured with a plurality of base apertures. Each of the first tabs is connected to and projects out from the base at a first side of the carrier. Each of the second tabs is connected to and projects out from the base at a second side of the carrier. Each of the nuts is aligned with a respective one of the base apertures. Each of the nuts is clamped between the base and a respective one of the first tabs. Each of the nuts is clamped between the base and a respective one of the second tabs. Each of the fasteners projects sequentially through a respective one of the first apertures, a respective one of the second apertures and a respective one of the base apertures. Each of the fasteners is mated with a respective one of the nuts.

According to still another aspect of the present disclosure, a nut strip assembly is provided for a gas turbine engine. This nut strip assembly includes a plurality of nuts and a monolithic carrier. The monolithic carrier includes a plurality of panels, a rail and a plurality of attachments clamping the nuts to the monolithic carrier. Each of the panels is configured with a respective aperture that is aligned with a respective one of the nuts. Each adjacent pair of the panels is separated by a respective slot. The rail is substantially perpendicular to and interconnects the panels.

The plurality of attachments may include a plurality of first tabs and a plurality of second tabs. The first tabs may project out from the rail. Each of the nuts may be clamped between a respective one of the first tabs and a respective one of the panels. The second tabs may project respectively out from the panels. Each of the nuts may be clamped between at least one of the second tabs and a respective one of the panels.

The first component may be configured as or otherwise include or be included in a first case for a gas turbine engine. The second component may be configured as or otherwise include or be included in a second case for the gas turbine engine.

The first component may include an arcuate first flange. The first apertures may be configured in the arcuate first flange. The second component may include an arcuate second flange. The second apertures may be configured in the arcuate second flange.

The base may include a plurality of segments and a plurality of slots. Each of the segments may be configured with a respective one of the apertures and abutted against a respective one of the nuts. Each of the slots may extend into the base from the second side and may be formed by and between each adjacent pair of the segments.

The base may also include a rail located at the first side. The rail may interconnect the segments together. The rail may abut against a respective flat surface of each of the nuts.

Each of the nuts may be captured between the base and another respective one of the second tabs.

The assembly may also include a plurality of fasteners. Each of the fasteners may be configured to project through a respective one of the apertures and mate with a respective one of the nuts.

The base may be configured with a plurality of slots. Each of the slots may be located between an adjacent pair of the nuts.

The base may include a plurality of segments. Each of the segments may be configured with a respective one of the apertures and abutted against a respective one of the nuts. Each of the slots may extend into the base from the second side and may be formed by and between each adjacent pair of the segments.

The base may also include a rail located at the first side. The rail may interconnect the segments together. The rail may abut against each of the nuts.

The rail may be substantially perpendicular to each of the segments.

The base may extend circumferentially about a centerline.

The plurality of nuts may be arranged in an arcuate array.

An annular portion of each of the nuts may project partially into a respective one of the apertures.

A first of the nuts may include a flange with a closed U-shaped sectional geometry.

A first of the nuts may include an at least partially circular annular surface and a polygonal surface that is substantially perpendicular to the at least partially circular annular surface. Each of the at least partially circular annular surface and the polygonal surface may contact the base.

The foregoing features and the operation of the invention will become more apparent in light of the following description and the accompanying drawings.

DETAILED DESCRIPTION

Figure 1:
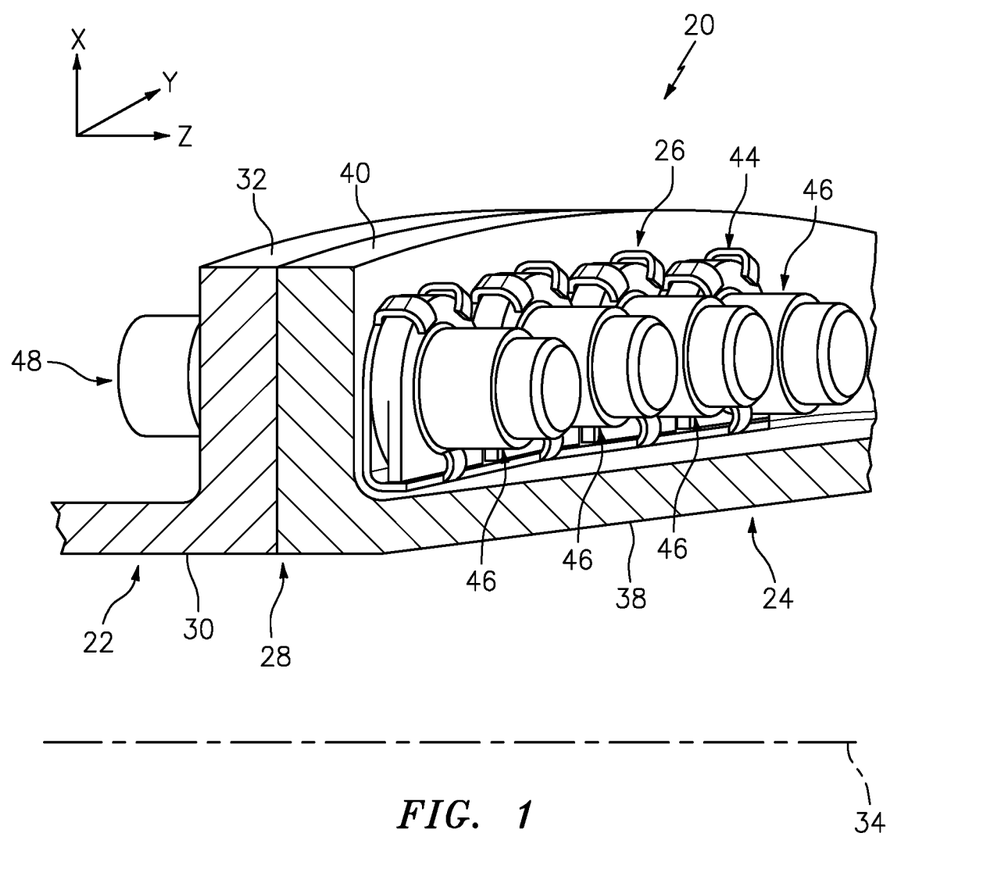
FIGS. 1 and 2 are perspective illustrations of a portion of a gas turbine engine assembly.
Figure 2:
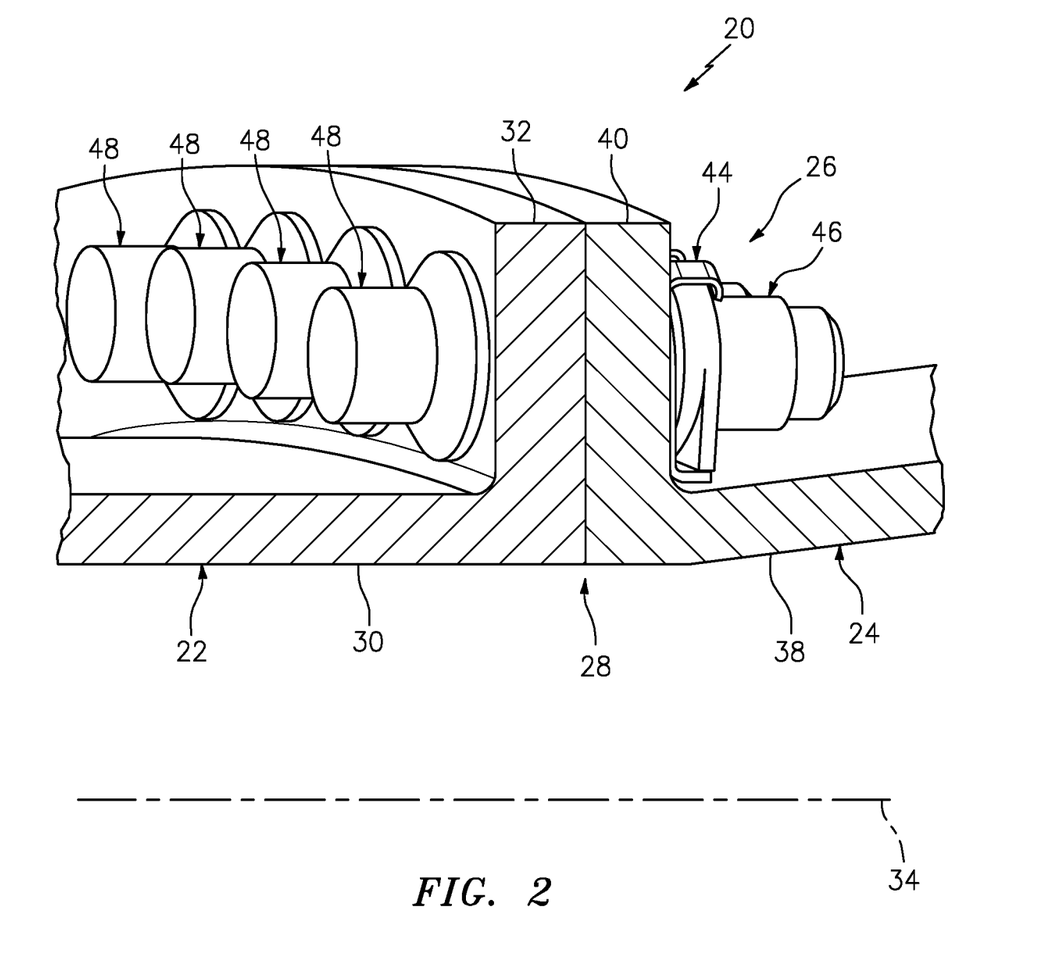

FIGS. 1 and 2 are perspective illustrations of an assembly 20. This assembly 20 of FIGS. 1 and 2 may be configured for an apparatus such as a gas turbine engine. The assembly 20 of the present disclosure, however, may alternatively be configured for non-gas turbine engine applications. For example, the assembly 20 may alternatively be configured for any application where a plurality of components are fastened together with a plurality of nuts and fasteners. However, for ease of description, the assembly 20 of FIGS. 1 and 2 is described below with respect to an exemplary gas turbine engine application.

The assembly 20 of FIGS. 1 and 2 includes a first component 22, a second component 24 and one or more nut strip assemblies 26 (one visible in FIGS. 1 and 2). Each of these nut strip assemblies 26 is configured to secure (e.g., mechanically fasten) the first component 22 and the second component 24 together at a joint 28 (e.g., a butt joint) as described below in further detail.

The first component 22 of FIGS. 1 and 2 is configured as a case for a gas turbine engine; e.g., a compressor or diffuser case. This first component 22 includes a (e.g., tubular) first body 30 and a (e.g., annular) first flange 32. The first body 30 extends circumferentially around an axial centerline 34 of the gas turbine engine (e.g., see FIG. 10). The first body 30 extends axially along the centerline 34 in a first (e.g., downstream, aft) direction to a distal end. The first flange 32 is located at (e.g., on, adjacent or proximate) the distal end, and projects radially (e.g., outward) from the first body 30. The first flange 32 is configured with a plurality (e.g., arcuate or annular array) of first component fastener apertures 36 (see FIG. 9); e.g., unthreaded through-holes. Each of these apertures 36 extends completely axially through the first flange 32 between opposing sides of the first flange 32. In some embodiments, the first component 22 may be constructed from metal; however, the present disclosure is not limited to such an exemplary first component material.

The second component 24 of FIGS. 1 and 2 is configured as a case for a gas turbine engine; e.g., a diffuser or combustor case. This second component 24 includes a (e.g., tubular) second body 38 and a (e.g., annular) second flange 40. The second body 38 extends circumferentially around the centerline 34. The second body 38 extends axially along the centerline 34 in a second (e.g., upstream, forward) direction to a distal end. The second flange 40 is located at the distal end, and projects radially (e.g., outward) from the second body 38. The second flange 40 is configured with a plurality (e.g., arcuate or annular array) of second component fastener apertures 42 (see FIG. 9); e.g., un-threaded through-holes. Each of these apertures 42 extends completely axially through the second flange 40 between opposing sides of the second flange 40. In some embodiments, the second component 24 may be constructed from metal; however, the present disclosure is not limited to such an exemplary second component material.

Figure 3:
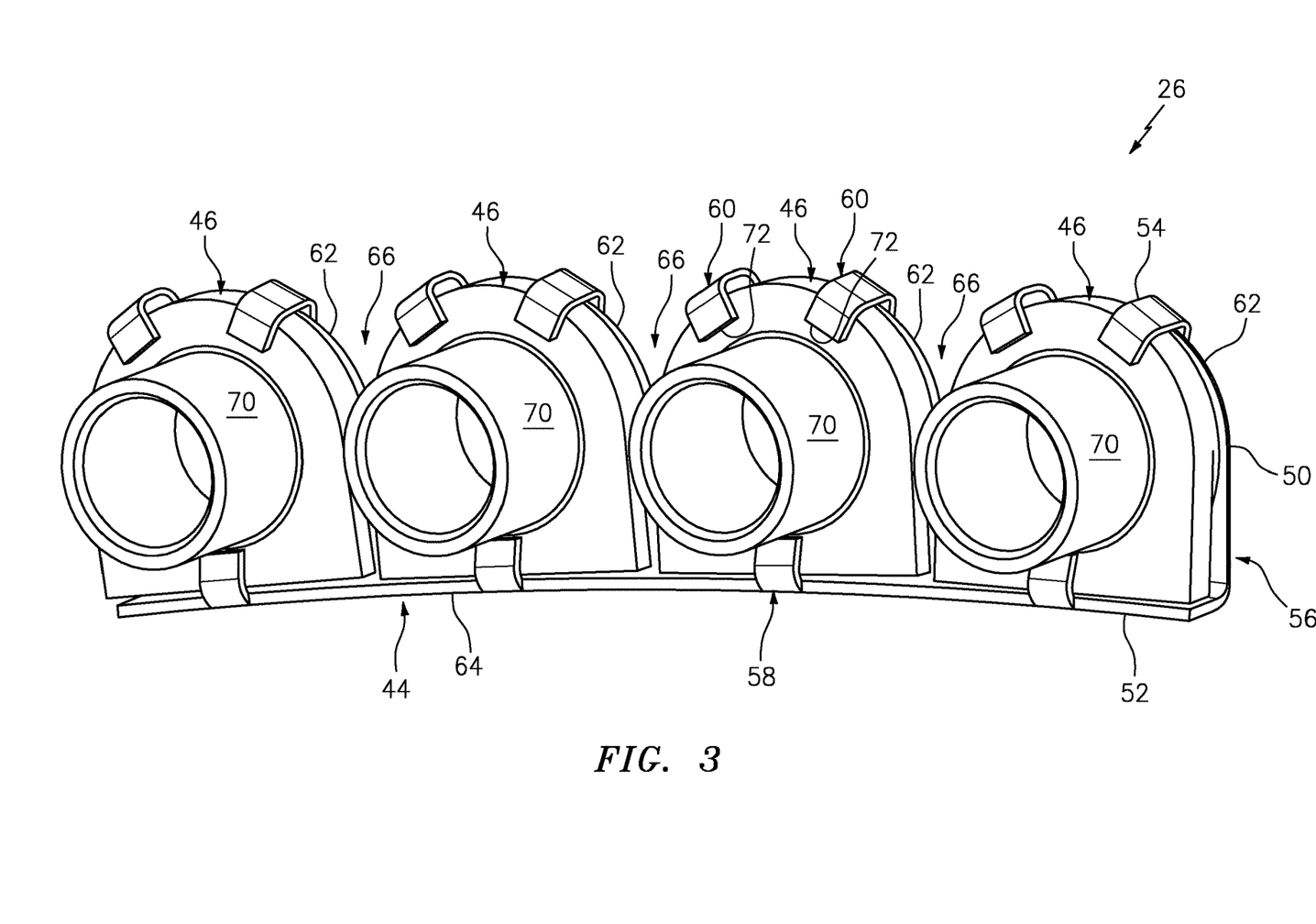
FIGS. 3-5 are perspective illustrations of a nut carrier configured with an array of captured nuts.
Figure 4:
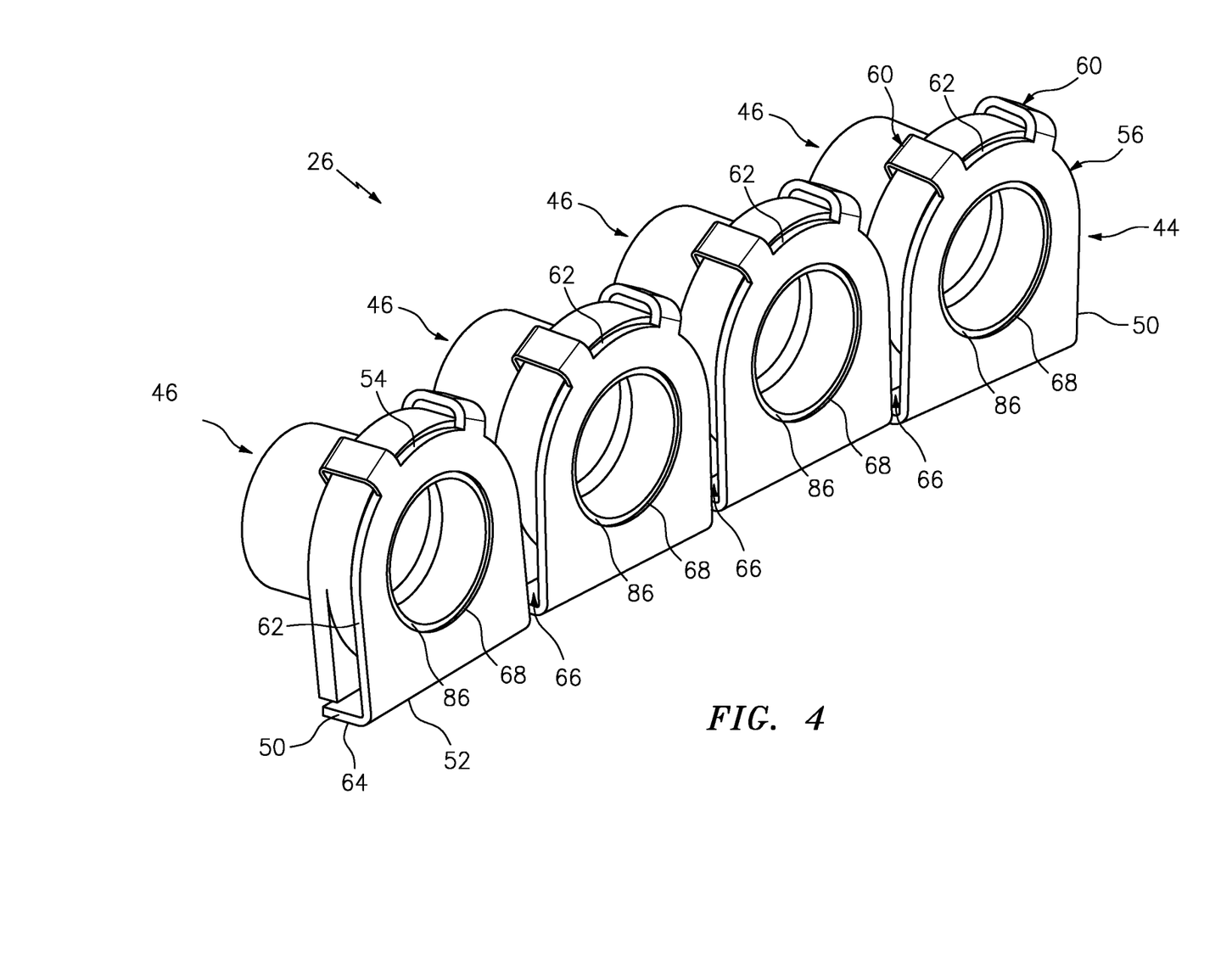
Figure 5:
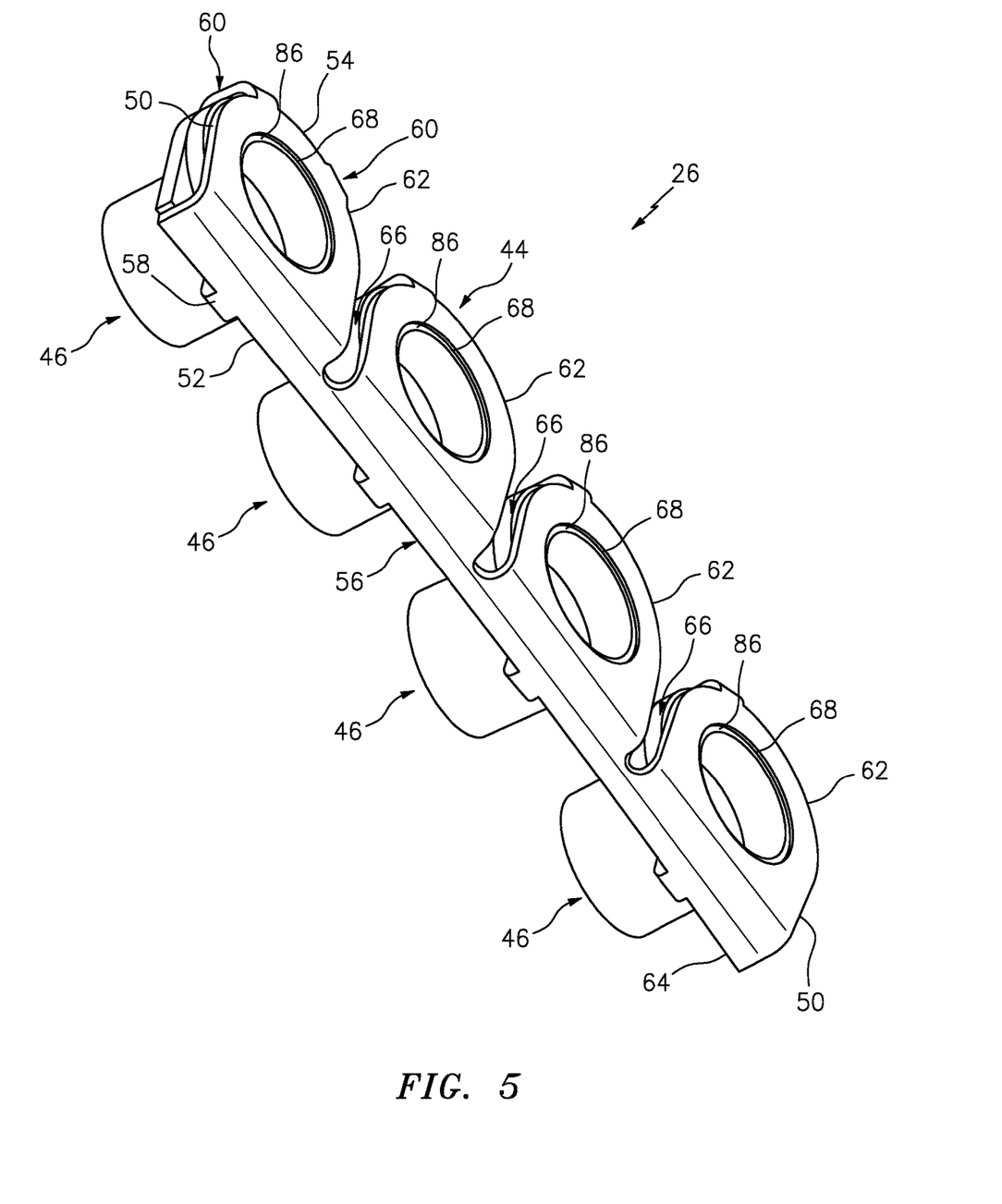

Referring now to FIGS. 3-5, each of the nut strip assemblies 26 includes a nut carrier 44, one or more nuts 46 and one or more threaded fasteners 48 (see FIGS. 1, 2 and 9); e.g., bolts, screws, etc. The carrier 44 may be configured as an arcuate, monolithic body as shown in the exemplary embodiment of FIGS. 3-5. The carrier 44, for example, may be constructed from a single sheet of material such as, but not limited to, sheet metal, where the single sheet of material is machined (e.g., cut, stamped, etc.) and folded into form. The carrier 44 of the present disclosure, however, is not limited to such an exemplary construction technique or materials. The term "monolithic" is used herein to describe a body that is stamped, machined, cast, additively manufactured and/or otherwise formed as a single, unitary body. By contrast, a non-monolithic body includes a plurality of discretely formed bodies that are attached (e.g., mechanically fastened) together after the formation of those bodies to provide the non-monolithic body.

Referring still to FIGS. 3-5, the carrier 44 extends longitudinally (e.g., circumferentially about the centerline 34 of FIGS. 1 and 2) between opposing carrier ends 50. The carrier 44 extends laterally (e.g., radially relative to the centerline 34) between a carrier first (e.g., inner) side 52 and a carrier second (e.g., outer) side 54. The carrier 44 includes a carrier base 56 and one or more attachments 58 and 60.

The carrier base 56 of FIGS. 3-5 includes a plurality of carrier segments 62 and a rail 64, which rail 64 interconnects the carrier segments 62 together and extends longitudinally between the opposing carrier ends 50. Each of the carrier segments 62 may be configured as a discrete nut backing panel. For example, the carrier segments 62 are arranged longitudinally along the rail 64. Each carrier segment 62 is connected to and projects laterally out (e.g., is cantilevered) from the rail 64. In this exemplary embodiment, each carrier segment 62 is at least substantially (e.g., within +/−5 degrees) or exactly perpendicular to the rail 64. A slot 66 is located between and thereby (e.g., completely longitudinally) separates each longitudinally adjacent pair of the carrier segments 62. Each slot 66 extends laterally (e.g., radially inward) into the carrier 44 from the second side 54 of the carrier 44 (and the carrier base 56) and into (or alternatively to or towards) the rail 64. These slots 66 enable the carrier base 56 to be bent (e.g., curved) about the centerline 34 and provide the carrier 44 and its base 56 with an arcuate body.

Each carrier segment 62 is configured with a respective base aperture 68 (see FIGS. 4 and 5); e.g., un-threaded through-hole. Each base aperture 68 extends completely axially through a respective carrier segment 62 between opposing surfaces of that segment 62.

The attachments of FIGS. 3-5 include one or more first tabs 58 and one or more second tabs 60. The first tabs 58 are located at the first side 52 of the carrier 44 and its base 56. The first tabs 58 are arranged longitudinally along the rail 64. The first tabs 58 are connected to the rail 64 at a distal side of the rail 64 that is opposite from the connection between the rail 64 and the carrier segments 62. Each first tabs 58 projects out from the rail 64 to an unsupported distal end 70 (see FIG. 3). When assembled, each first tab 58 laterally overlaps a respective one of the carrier segments 62 and is thereby operable to secure (e.g., axially capture, clamp, etc.) a respective one of the nuts 46 between the carrier elements 58 and 62.

The second tabs 60 are located at the second side 54 of the carrier 44 and its base 56. The second tabs 60 are longitudinally along the carrier base 56. The second tabs 60 are respectively connected to the carrier segments 62. The second tabs 60 of FIGS. 3 and 4, for example, are arranged into a plurality of sets of two tabs 60, where each set of tabs 60 is connected to a respective one of the carrier segments 62. However, in other embodiments, a single second tab 60 or more than two second tabs 60 may be configured with each carrier segment 62. Each second tab 60 of FIGS. 3 and 4 projects out from the respective carrier segment 62 to an unsupported distal end 72 (see FIG. 3). When assembled, each second tab 60 overlaps the rail 64 as well as laterally overlaps the associated respective carrier segment 62 and thereby is operable to secure (e.g., axially capture, clamp, etc.) a respective one of the nuts 46 between the carrier elements 60 and 62.

Figure 6:
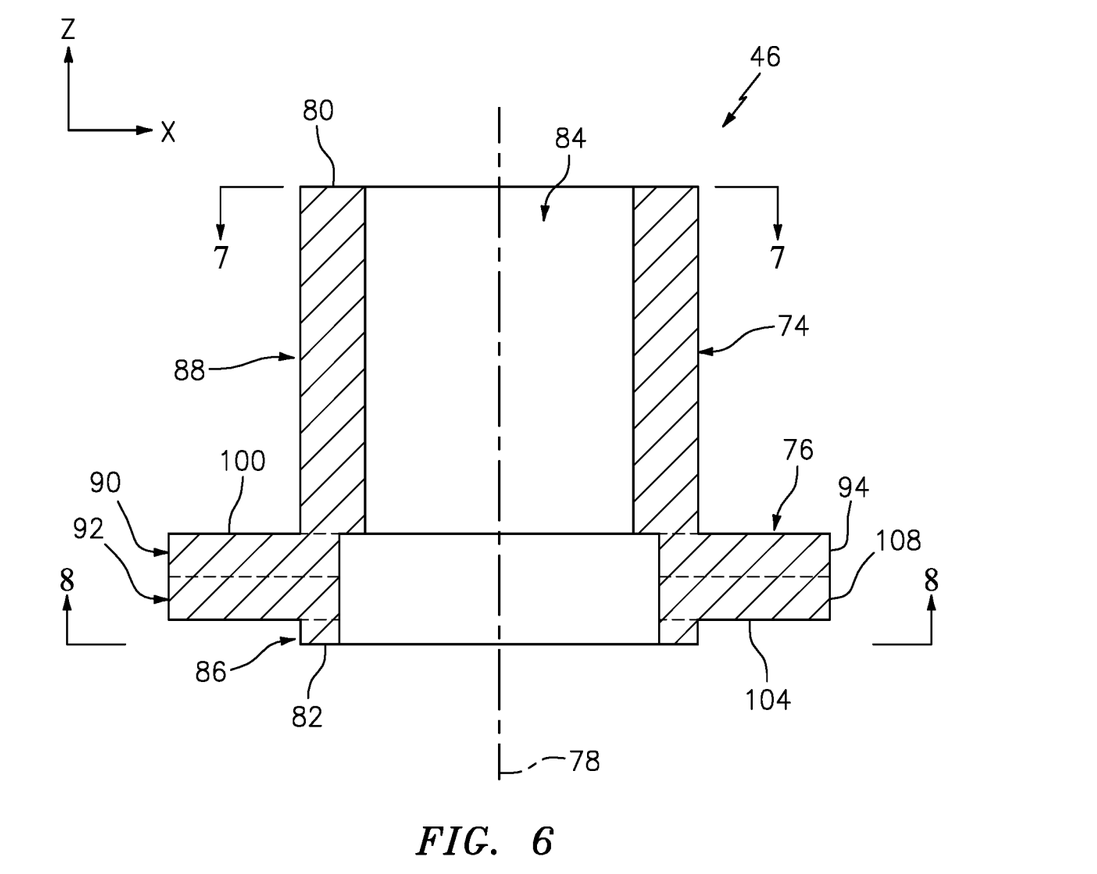
FIG. 6 is a side-sectional illustration of one of the captured nuts.
Figure 7:
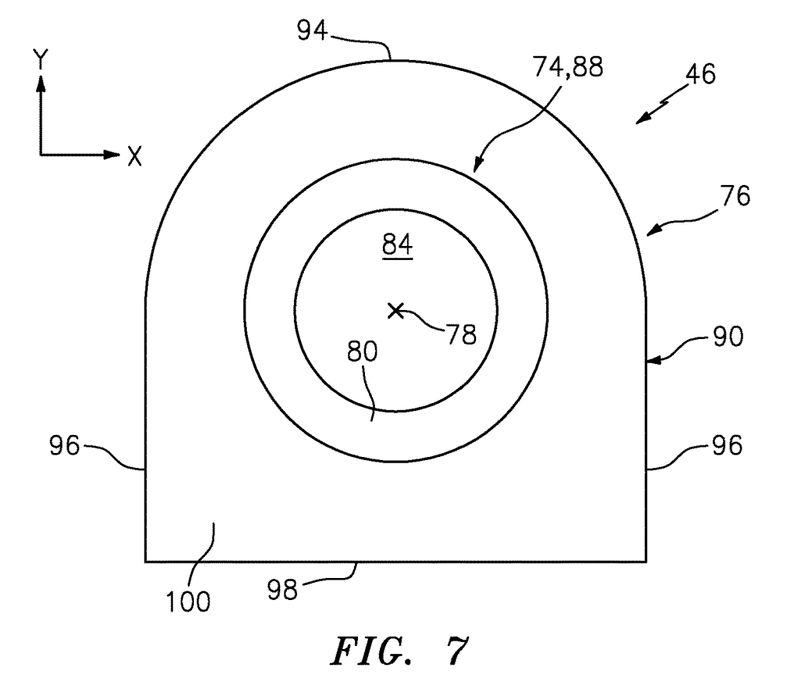
FIG. 7 is a first end-view illustration of the captured nut of FIG. 6 taken along line 7-7.
Figure 8:
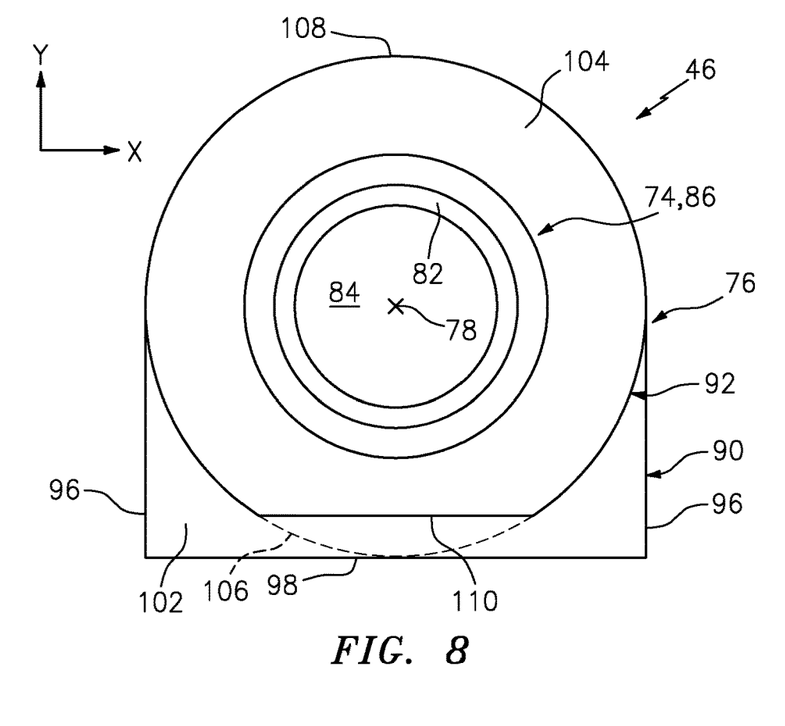
FIG. 8 is a second end-view illustration of the captured nut of FIG. 6 taken along line 8-8.

Referring now to FIGS. 6-8, each of the nuts 46 includes a tubular body 74 and a flange 76. The tubular body 74 extends axially along a nut axis 78 between a nut first end 80 and a nut second end 82. This tubular body 74 defines an inner bore 84, which extends completely through the respective nut 46 between the first and the second ends 80 and 82. The tubular body 74 includes an annular portion 86 and a tubular portion 88. The annular portion 86 is located at the nut second end 82. In particular, the annular portion 86 extends axially along the axis 78 from the flange 76 to the nut second end 82. The tubular portion 88 is located at the nut first end 80. In particular, the tubular portion 88 extends axially along the axis 78 from the flange 76 to the nut first end 80. The inner bore 84 along the tubular portion 88 of FIG. 6 is threaded, and the remaining portion of the inner bore 84 is unthreaded. Of course, in other embodiments, the threaded portion of the inner bore 84 may extend for a longer or shorter distance than shown in FIG. 6. For example, the threaded portion of the inner bore 84 may extend for a select portion of the tubular portion 88, or may extend past the tubular portion 88 towards, to, or into the annular portion 86.

The flange 76 may be configured with a closed U-shaped sectional geometry. The flange 76 of FIGS. 7 and 8, for example, includes a first flange portion 90 and a second flange portion 92. The first flange portion 90 is disposed axially along the axis 78 between (e.g., and adjacent) the tubular portion 88 and the second flange portion 92. At least this first flange portion 90 forms the closed U-shaped sectional geometry of the flange 76. The first flange portion 90, for example, includes a partially circular (e.g., semi-circular, arcuate) surface 94 that transitions into, at opposing circumferential ends, opposing (e.g., rectangular) planar surfaces 96, which are tangential to the circular surface 94. The first flange portion 90 also includes another (e.g., rectangular or otherwise polygonal) planar surface 98, which surface 98 is contiguous with and extends between corner ends of the surfaces 96. This surface 98 may be substantially perpendicular to the surfaces 96. With this configuration, the flange 76 and its first flange portion 90 extend in an x-direction (e.g., radially relative to the centerline 34) between the surfaces 96 and in a y-direction (e.g., circumferentially or tangentially relative to the centerline 34) between the surfaces 94 and 98. The first flange portion 90 also extends axially relative to the axis 78 between axially opposing surfaces 100 and 102, which may be perpendicular to the surface 98.

The second flange portion 92 is disposed axially along the axis 78 between (e.g., and adjacent) the annular portion 86 and the first flange portion 90. More particularly, the second flange portion 92 extends axially, relative to the axis 78, out from the first flange portion 90 and its surface 102 to an at least partially circular annular surface 104. In the embodiment of FIG. 8, the surface 104 has a circular annular shape with at least one circular segment (see dashed line 106) or notch removed from an outer peripheral portion of the surface 104. With this configuration, the second flange portion 92 further includes a partially circular (e.g., semi-circular, arcuate) surface 108 and a (e.g., rectangular or otherwise polygonal) planar surface 110. The partially circular surface 108 extends about the axis 78 between opposing circumferential ends. The planar surface 110 is contiguous with and extends between the opposing circumferential ends of the partially circular surface 108. The planar surface 110 may be substantially parallel with the planar surface 98, but set back (e.g., radially inward of) the planar surface 98 such that the first flange portion 90 forms an overhang/shelf adjacent the surface 110.

It is worth noting, while the flange 76 is described above as having a closed U-shaped sectional geometry, the flange 76 may alternatively be configured with another sectional geometry. For example, in other embodiments, the flange 76 may have a rectangular or otherwise polygonal or curved (e.g., circular) sectional geometry.

Referring to FIGS. 3-5, each of the nuts 46 is aligned with a respective one of the base apertures 68 such that, for example, the axis 78 (see FIG. 6) of the nut and an axis of the base aperture 68 are substantially coaxial. The nuts 46 are thereby arranged in an arcuate array about the centerline 34. The annular portion 86 of each nut 46 is further mated with the respective base aperture 68. Each annular portion 86, for example, may project partially into the base aperture 68. This mating ensures the nut is properly positioned relative to the respective carrier segment 62 in a plane perpendicular to the centerline 34. The surface 104 of the nut 46 engages (e.g., contacts, is abutted against) the respective carrier segment 62; see FIG. 9. The surface 98 of the nut 46 similarly engages the rail 64 (see FIG. 9), which engagement may serve to prevent rotation of the nut 46 about its axis 78. Once the nut 46 is properly positioned with the carrier 44, associated first and second tabs 58 and 60 may be bent over to secure the nut 46 with the carrier 44 as described above.

Figure 9:
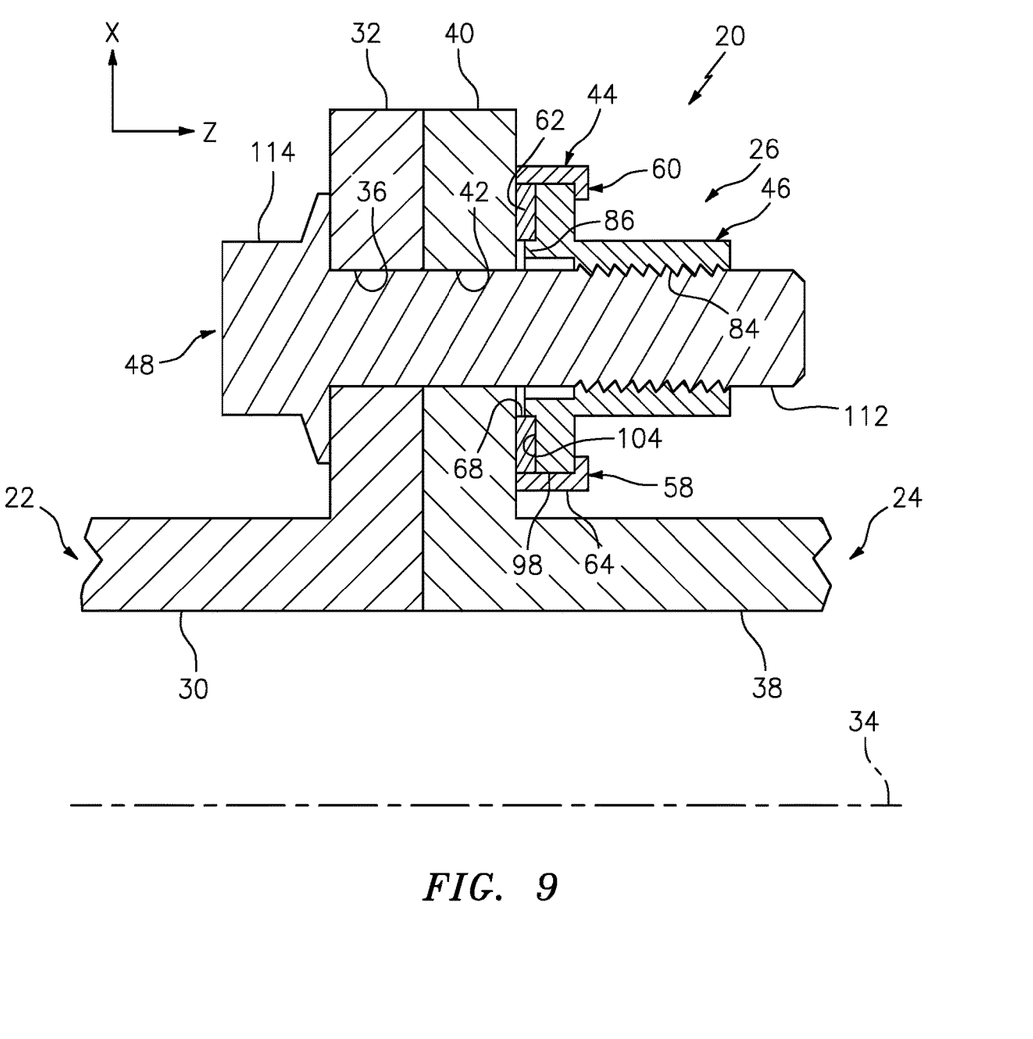
FIG. 9 is a side-sectional illustration of the portion of the assembly of FIGS. 1 and 2.

Referring to FIG. 9, the first flange 32 is positioned axially adjacent the second flange 40 such that, for example, the side flange surfaces engage (e.g., contact, abut, etc.) one another. Each nut strip assembly 26 is positioned adjacent the second flange 40 such that, for example, carrier 44 engages the opposing side surface of the second flange 40. The fasteners 48 are subsequently mated with the apertures 36, 42 and 68 and the nut 46 to secure the flanges 32 and 40 together. More particularly, a cylindrical portion 112 of each fastener 48 projects out from a head 114, sequentially through the apertures 36, 42 and 68, and is then threaded into or through the bore 84 of the respective nut 46; e.g., mated with/threaded into the nut 46.

Figure 10:
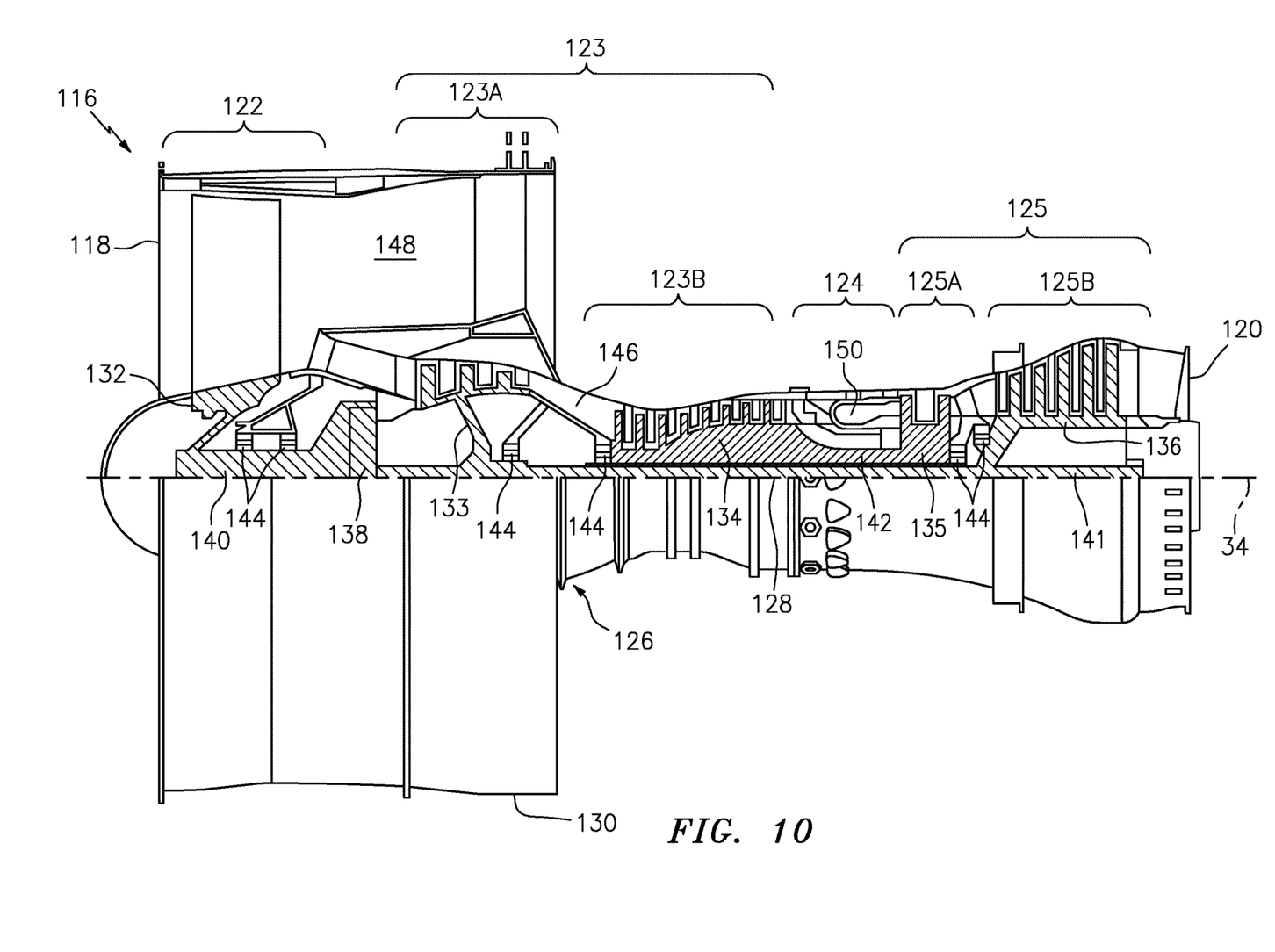
FIG. 10 is a side cutaway illustration of a geared turbine engine which may include the assembly of FIGS. 1 and 2.

FIG. 10 is a side cutaway illustration of a geared turbine engine 116 that may be configured with the assembly 20 of FIGS. 1 and 2. This turbine engine 116 extends along the axial centerline 34 between an upstream airflow inlet 118 and a downstream airflow exhaust 120. The turbine engine 116 includes a fan section 122, a compressor section 123, a combustor section 124 and a turbine section 125. The compressor section 123 includes a low pressure compressor (LPC) section 123A and a high pressure compressor (HPC)

section 123B. The turbine section 125 includes a high pressure turbine (HPT) section 125A and a low pressure turbine (LPT) section 125B.

The engine sections 122-125 are arranged sequentially along the centerline 34 within an engine housing 126. This housing 126 includes an inner casing 128 (e.g., a core casing) and an outer casing 130 (e.g., a fan casing). The inner casing 128 may house one or more of the engine sections 123-125; e.g., an engine core. The outer casing 130 may house at least the fan section 122. Each of these casing 128, 130 may include one or more cases; e.g., the inner casing 128 may include the first component 22 and the second component 24 of FIGS. 1 and 2.

Referring again to FIG. 10, each of the engine sections 122, 123A, 123B, 125A and 125B includes a respective rotor 132-136. Each of these rotors 132-136 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 132 is coupled to a gear train 138, for example, through a fan shaft 140. The gear train 138 and the LPC rotor 133 are coupled to and driven by the LPT rotor 136 through a low speed shaft 141. The HPC rotor 134 is coupled to and driven by the HPT rotor 135 through a high speed shaft 142. The shafts 140-142 are rotatably supported by a plurality of bearings 144; e.g., rolling element and/or thrust bearings. Each of these bearings 144 is coupled to the engine housing 126 by at least one stationary structure such as, for example, an annular support strut.

During operation, air enters the turbine engine 116 through the airflow inlet 118. This air is directed through the fan section 122 and into a core gas path 146 and a bypass gas path 148. The core gas path 146 extends sequentially through the engine sections 123-125. The air within the core gas path 146 may be referred to as "core air". The bypass gas path 148 extends through a bypass duct, which bypasses the engine core. The air within the bypass gas path 148 may be referred to as "bypass air".

The core air is compressed by the compressor rotors 133 and 134 and directed into a combustion chamber 150 of a combustor in the combustor section 124. Fuel is injected into the combustion chamber 150 and mixed with the compressed core air to provide a fuel-air mixture. This fuel air mixture is ignited and combustion products thereof flow through and sequentially cause the turbine rotors 135 and 136 to rotate. The rotation of the turbine rotors 135 and 136 respectively drive rotation of the compressor rotors 134 and 133 and, thus, compression of the air received from the core airflow inlet. The rotation of the turbine rotor 136 also drives rotation of the fan rotor 132, which propels bypass air through and out of the bypass gas path 148. The propulsion of the bypass air may account for a majority of thrust generated by the turbine engine 116, e.g., more than seventy-five percent (75%) of engine thrust. The turbine engine 116 of the present disclosure, however, is not limited to the foregoing exemplary thrust ratio.

The assembly 20 may be included in various gas turbine engines other than the one described above as well as in other types of rotational equipment and non-rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While the nut carrier 44 is illustrated and described above as being arcuate (e.g., parti-circular), the nut strip assembly of the present disclosure is not limited to such an exemplary embodiment. For example, in other embodiments, the nut carrier 44 may follow a straight linear trajectory. In still other embodiments, the nut carrier 44 may follow a tortuous trajectory; e.g., a wavy, sinusoidal or other non-straight, non-arcuate trajectory.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A nut strip assembly, comprising:
   a carrier including a base, a plurality of first tabs and a plurality of second tabs, the base configured with a plurality of apertures, each of the plurality of first tabs connected to and projecting out from a first side of the base, and each of the plurality of second tabs connected to and projecting out from a second side of the base; and
   a plurality of nuts secured to the carrier, each of the plurality of nuts aligned with a respective one of the plurality of apertures, each of the plurality of nuts captured between the base and a respective one of the plurality of first tabs, and each of the plurality of nuts captured between the base and a respective one of the second tabs;
   wherein an annular portion of each of the plurality of nuts projects partially into a respective one of the plurality of apertures; and
   wherein the base is configured with a plurality of slots, and each of the plurality of slots is located between an adjacent pair of the plurality of nuts.

2. The nut strip assembly of claim 1, wherein each of the plurality of nuts is captured between the base and another respective one of the second tabs.

3. The nut strip assembly of claim 1, further comprising a plurality of fasteners, each of the plurality of fasteners configured to project through a respective one of the plurality of apertures and mate with a respective one of the plurality of nuts.

4. The nut strip assembly of claim 1, wherein
   the base comprises a plurality of segments;
   each of the plurality of segments is configured with a respective one of the apertures and abutted against a respective one of the plurality of nuts; and
   each of the plurality of slots extends into the base from the second side and is formed by and between each adjacent pair of the plurality of segments.

5. The nut strip assembly of claim 4, wherein the base further comprises a rail located at the first side, the rail interconnects the plurality of segments together, and the rail abuts against each of the plurality of nuts.

6. The nut strip assembly of claim 5, wherein the rail is substantially perpendicular to each of the plurality of segments.

7. The nut strip assembly of claim 1, wherein the base extends circumferentially about a centerline.

8. The nut strip assembly of claim 1, wherein the plurality of nuts are arranged in an arcuate array.

9. An assembly, comprising:
a first component configured with a plurality of first apertures;
a second component configured with a plurality of second apertures; and
the nut strip assembly of claim 1, the nut strip assembly securing the first component and the second component together, the nut strip assembly further comprising a plurality of fasteners;
each of the plurality of fasteners projecting sequentially through a respective one of the plurality of first apertures, a respective one of the plurality of second apertures and a respective one of the plurality of apertures in the base, and each of the plurality of fasteners mated with a respective one of the plurality of nuts.

10. The assembly of claim 9, wherein the first component is a first case for a gas turbine engine, and the second component is a second case for the gas turbine engine.

11. The assembly of claim 9, wherein
the first component comprises an arcuate first flange, and the plurality of first apertures are configured in the arcuate first flange; and
the second component comprises an arcuate second flange, and the plurality of second apertures are configured in the arcuate second flange.

12. A nut strip assembly, comprising:
a carrier including a base, a plurality of first tabs and a plurality of second tabs, the base configured with a plurality of apertures, each of the plurality of first tabs connected to and projecting out from a first side of the base, and each of the plurality of second tabs connected to and projecting out from a second side of the base; and
a plurality of nuts secured to the carrier, each of the plurality of nuts aligned with a respective one of the plurality of apertures, each of the plurality of nuts captured between the base and a respective one of the plurality of first tabs, and each of the plurality of nuts captured between the base and a respective one of the second tabs;
wherein a first of the plurality of nuts comprises a flange with a closed U-shaped sectional geometry.

13. A nut strip assembly for a gas turbine engine, comprising:
a plurality of nuts; and
a monolithic carrier comprising a plurality of panels, a rail and a plurality of attachments clamping the plurality of nuts to the monolithic carrier;
each of the plurality of panels configured with a respective aperture that is aligned with a respective one of the plurality of nuts;
each adjacent pair of the plurality of panels separated by a respective slot;
the rail substantially perpendicular to and interconnecting the plurality of panels;
the plurality of attachments comprising a plurality of first tabs and a plurality of second tabs;
the plurality of first tabs projecting out from the rail, and each of the plurality of nuts clamped between a respective one of the plurality of first tabs and a respective one of the plurality of panels; and
the plurality of second tabs projecting respectively out from the plurality of panels, and each of the plurality of nuts clamped between at least one of the plurality of second tabs and a respective one of the plurality of panels.

14. An assembly, comprising:
a first component configured with a plurality of first apertures;
a second component configured with a plurality of second apertures; and
the nut strip assembly of claim 12, the nut strip assembly securing the first component and the second component together, the nut strip assembly further comprising a plurality of fasteners;
each of the plurality of fasteners projecting sequentially through a respective one of the plurality of first apertures, a respective one of the plurality of second apertures and a respective one of the plurality of apertures in the base, and each of the plurality of fasteners mated with a respective one of the plurality of nuts.

15. The assembly of claim 14, wherein the first component is a first case for a gas turbine engine, and the second component is a second case for the gas turbine engine.

16. The assembly of claim 14, wherein
the first component comprises an arcuate first flange, and the plurality of first apertures are configured in the arcuate first flange; and
the second component comprises an arcuate second flange, and the plurality of second apertures are configured in the arcuate second flange.

* * * * *